(12) United States Patent
Deah

(10) Patent No.: US 9,347,603 B2
(45) Date of Patent: May 24, 2016

(54) COUNTERWEIGHT HOISTING APPARATUS

(71) Applicant: Taggart Global, LLC, Canonsburg, PA (US)

(72) Inventor: Brian Deah, Allison Park, PA (US)

(73) Assignee: TAGGART GLOBAL, LLC, Canonsburg, PA (US)

( * ) Notice: Subject to any disclaimer, the term of this patent is extended or adjusted under 35 U.S.C. 154(b) by 365 days.

(21) Appl. No.: 13/922,731

(22) Filed: Jun. 20, 2013

(65) Prior Publication Data

US 2014/0374548 A1 Dec. 25, 2014

(51) Int. Cl.
- *B65G 23/44* (2006.01)
- *F16M 11/18* (2006.01)
- *B66C 5/02* (2006.01)
- *B66F 7/20* (2006.01)

(52) U.S. Cl.
CPC ............... *F16M 11/18* (2013.01); *B66C 5/02* (2013.01); *B66F 7/20* (2013.01); *B65G 23/44* (2013.01)

(58) Field of Classification Search
CPC ......... B65G 23/44; B65G 35/06; B65G 17/48
USPC .............................................. 198/815, 468.8
See application file for complete search history.

(56) References Cited

U.S. PATENT DOCUMENTS

| | | | |
|---|---|---|---|
| 2,420,903 A | 5/1947 | Noble | |
| 3,330,419 A | 7/1967 | Joseph | |
| 3,330,583 A | 7/1967 | Kennedy et al. | |
| 3,741,409 A * | 6/1973 | Painter | B65G 61/00 294/98.1 |
| 3,751,863 A | 8/1973 | Lyons | |
| 4,909,358 A * | 3/1990 | Jansen | E01B 25/00 187/255 |
| 5,059,086 A * | 10/1991 | Thierion | B65G 61/00 294/65 |
| 5,159,993 A | 11/1992 | St-Germain | |
| 5,690,315 A | 11/1997 | Thomas | |
| 5,908,088 A | 6/1999 | Webster et al. | |
| 6,062,403 A | 5/2000 | Baumann et al. | |
| 6,095,285 A | 8/2000 | St-Germain | |
| 6,253,907 B1 | 7/2001 | Lachmann et al. | |
| 6,354,769 B1 | 3/2002 | Allen | |
| 6,681,942 B2 | 1/2004 | Haney | |
| 6,695,097 B1 | 2/2004 | Wiklund | |
| 6,883,643 B2 | 4/2005 | Robillard | |
| 7,044,269 B2 | 5/2006 | Azran | |
| 7,090,051 B2 | 8/2006 | Robillard | |
| 7,748,193 B2 | 7/2010 | Knigge et al. | |
| 7,997,387 B2 | 8/2011 | Rauch et al. | |

(Continued)

FOREIGN PATENT DOCUMENTS

GB 726089 * 3/1955 ............. B65G 17/12
KR 200347440 Y1 4/2004

*Primary Examiner* — James R Bidwell
(74) *Attorney, Agent, or Firm* — The Webb Law Firm (57) ABSTRACT

A hoisting apparatus includes at least one pair of substantially vertical columns defining a frame. A tie bar and a carriage are selectively securable to the at least one pair of columns and oriented substantially perpendicular to the columns. A lifting device connected to the tie bar at a first end and to the carriage at a second end. The lifting device is operable to cause movement of the tie bar relative to the at least one pair of columns when the carriage is secured to the at least one pair of columns and to cause movement of the carriage relative to the at least one pair of columns when the tie bar is secured to the at least one pair of columns. The hoisting apparatus is connectable to a counterweight of a belt conveyor for raising or lowering the conveyor in a series of incremental hoisting steps.

6 Claims, 8 Drawing Sheets

(56) References Cited

U.S. PATENT DOCUMENTS

| | | |
|---|---|---|
| 8,118,181 B2 | 2/2012 | Shinozaki |
| 8,167,089 B2 | 5/2012 | Castle |
| 2006/0151247 A1 | 7/2006 | Raffler et al. |
| 2006/0151255 A1 | 7/2006 | Payne |
| 2008/0230322 A1* | 9/2008 | Chung .................... B66B 17/12 187/250 |
| 2012/0018253 A1 | 1/2012 | Taberah |
| 2012/0018255 A1 | 1/2012 | Gross |
| 2014/0353089 A1* | 12/2014 | Shani ....................... B66B 9/00 187/254 |

* cited by examiner

COUNTERWEIGHT HOISTING APPARATUS

BACKGROUND OF THE INVENTION

1. Field of the Invention

This disclosure relates generally to a hoisting apparatus and method and, particularly, to a hoisting apparatus and a method for hoisting a counterweight of a conveyor belt in a conveyor system.

2. Description of Related Art

Conveyor systems are used in many industries to facilitate handling of items or materials. In particular, conveyor systems are useful in transporting heavy or bulky materials over fixed distances where the use of human labor or other types of machinery is laborious and/or expensive. Due to the speed and efficiency of transport, conveyor systems are widely used in material handling industries, such as handling of mining or agriculture materials. Conveyor systems in the material handling industries may be used, for example, to transport excavated materials in an above-ground mine from an excavation site to a remote location for further processing, storage, or transport. Such conveyor systems utilize a continuously moving belt that is driven by one or more pulleys.

The conveyor system used for transporting excavated materials is often the lifeline in mine operation. Because proper functioning of the conveyor system is required for carrying excavated materials from the excavation site, regular inspection and maintenance of the conveyor components are essential. While certain conveyor inspection and maintenance processes can be carried out while the conveyor is running, such as lubricating the bearings, other processes can be performed only when the conveyor system is shut down. Due to the importance of a working conveyor system in transporting excavated materials, it is important to minimize the time that the conveyor system is shut down and perform the inspection and maintenance processes as quickly and efficiently as possible.

One inspection and maintenance process that may require stopping the conveyor system relates to the servicing or adjustment of the conveyor counterweight. In general, the conveyor counterweight is used to adjust the tension of the conveyor belt. Proper tensioning of the conveyor belt is important because it avoids damage to the conveyor belt and prevents premature wear of the conveyor system components. Typically, tensioning of the conveyor belt is effected by moving a pulley attached to a counterweight assembly by gravity. The conveyor belt wraps around the pulley. Moving the pulley in one direction increases the tension in the conveyor belt, while moving the drum in the opposite direction reduces the tension in the conveyor belt. Because the conveyor systems used in transporting excavated materials are designed to transport many tons of excavated materials, heavy counterweights, weighing 2,000 to 100,000 pounds or more, are used to maintain the proper tension in the conveyor belt.

In certain situations, the heavy counterweight must be moved to facilitate servicing of the conveyor system. Due to the size and weight of the counterweight, specialized equipment, such as a heavy-duty crane, must be brought to hoist the counterweight. The crane is positioned proximate the counterweight such that it can be temporarily hoisted from its initial location.

The conventional procedure for hoisting the conveyor counterweight by crane has several disadvantages. Such procedure complicates the servicing process by requiring additional specialized equipment and personnel trained to safely operate the equipment. This increases the servicing cost and the time during which the conveyor system is out of operation. Often, the entire mining site must be shut down because excavated materials cannot be carried away.

SUMMARY OF THE INVENTION

Accordingly, in view of the several disadvantages of the prior art, there exists a need in the art for a hoisting apparatus for hoisting a conveyor belt counterweight without requiring additional specialized equipment and personnel. While a method of hoisting the conveyor belt counterweight is known in the material handling industry, improved apparatus and method which does not increase the servicing cost and the time during which the conveyor system is out of operation are desired.

While various embodiments of a hoisting apparatus and method of operation thereof are described in detail herein, one embodiment of the hoisting apparatus may include at least one pair of columns defining a frame, a tie bar selectively securable to the at least one pair of columns, and a carriage selectively securable to the at least one pair of columns. A lifting device may be connected to the tie bar at a first end and to the carriage at a second end. In one embodiment, the lifting device may be operable to cause movement of the tie bar relative to the at least one pair of columns when the carriage is secured to the at least one pair of columns and to cause movement of the carriage relative to the at least one pair of columns when the tie bar is secured to the at least one pair of columns.

In accordance with another embodiment, the at least one pair of columns may be oriented in a substantially vertical direction. Each of the at least one pair of columns may be a tube having a hollow interior. The hollow interior of each of the at least one pair of columns may be at least partially filled with a grout material. Each of the at least one pair of columns may include a plurality of openings extending therethrough. The openings may be separated at substantially equal intervals along a longitudinal length of each of the at least one pair of columns. One or both of the tie bar and the carriage may be selectively securable to the at least one pair of columns by at least one pin extending through at least one of the plurality of openings. The at least one pin may engage at least one recess on the tie bar or the carriage.

In yet another embodiment, the lifting device may include a cylinder secured to one of the tie bar and the carriage and a piston secured to the other of the tie bar and the carriage. The lifting device may be hydraulically, pneumatically, or electrically operated. One or both of the tie bar and the carriage may be oriented substantially perpendicular to the at least one pair of columns.

In accordance with a further embodiment, a counterweight hoisting apparatus may be adapted for hoisting a counterweight of a belt conveyor. The counterweight hoisting apparatus may include at least one pair of substantially vertical columns defining a frame, where each of the at least one pair of columns having a hollow interior and a plurality of openings extending through a sidewall. Additionally, the counterweight hoisting apparatus may include a tie bar selectively securable to the at least one pair of columns and oriented substantially perpendicular to the at least one pair of columns. A carriage may be selectively securable to the at least one pair of columns and oriented substantially perpendicular to the at least one pair of columns. A lifting device may be connected to the tie bar at a first end and to the carriage at a second end. The lifting device may be operable to cause movement of the tie bar relative to the at least one pair of columns when the carriage is secured to the at least one pair of columns and to cause movement of the carriage relative to the at least one pair of columns when the tie bar is secured to the at least one pair of columns. One or both of the tie bar and the carriage may be selectively securable to the at least one pair of columns by at least one pin extending through at least one of the plurality of openings.

In yet another embodiment, a method of hoisting a counterweight of a belt conveyor may include the steps of securing a carriage of a hoisting apparatus to at least one pair of substantially vertical columns, securing a counterweight to a tie bar of the hoisting apparatus, and operating a lifting device to cause movement of the tie bar toward or away from the carriage.

These and other features and characteristics of the counterweight hoisting apparatus, as well as the methods of manufacture and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a", "an", and "the" include plural referents unless the context clearly dictates otherwise.

DESCRIPTION OF THE PREFERRED EMBODIMENTS

For purposes of the description hereinafter, spatial orientation terms, as used, shall relate to the referenced embodiment as it is oriented in the accompanying drawing figures or otherwise described in the following detailed description. However, it is to be understood that the embodiments described hereinafter may assume many alternative variations and configurations. It is also to be understood that the specific components, devices, and features illustrated in the accompanying drawing figures and described herein are simply exemplary and should not be considered as limiting.

Figure 1:
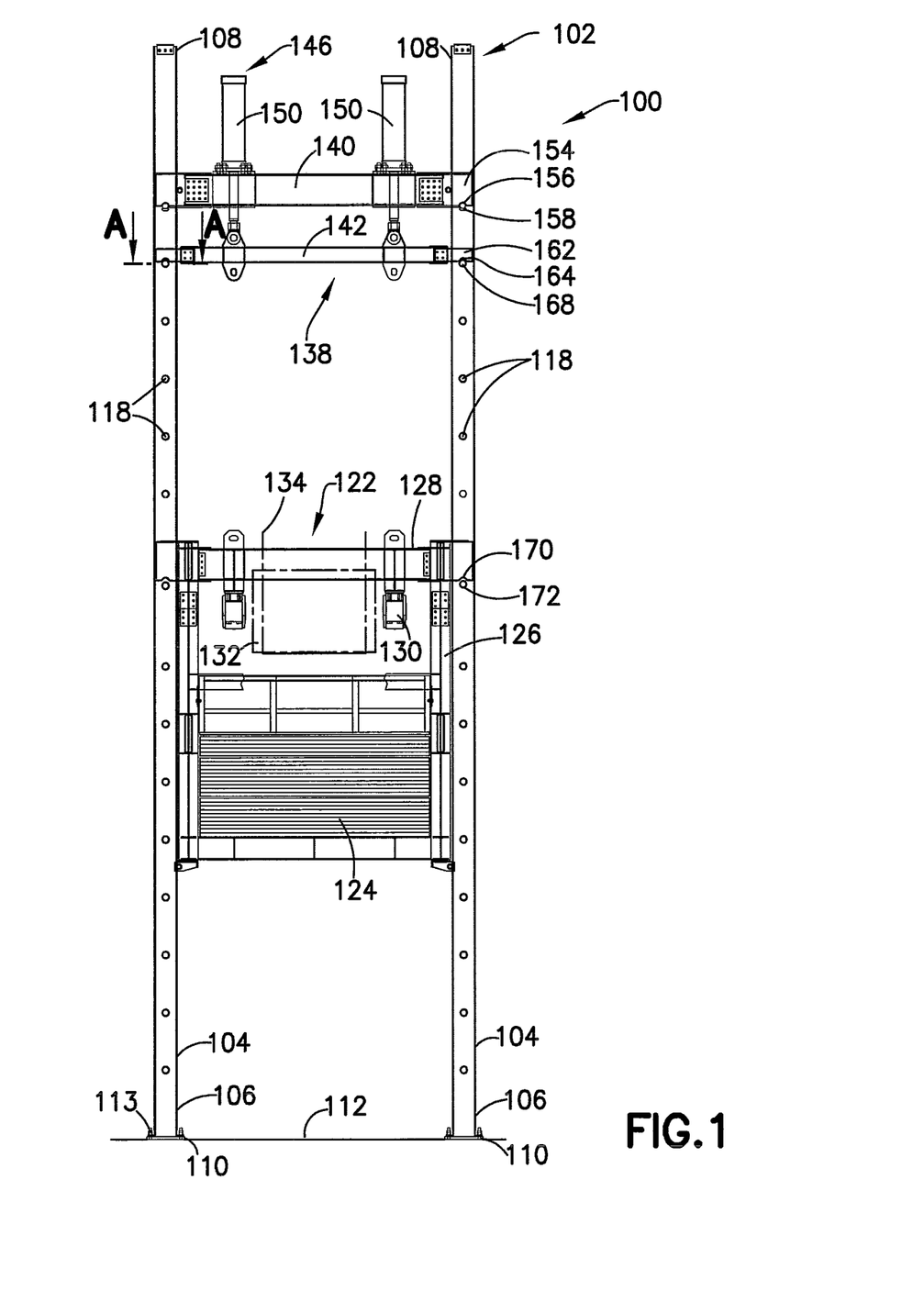
FIG. 1 is a front view of a counterweight hoisting apparatus according to one embodiment.

FIG. 1 is a front view of a counterweight hoisting apparatus 100 (hereinafter referred to as "hoisting apparatus 100") according to one embodiment. The hoisting apparatus 100 is adapted for installation on a conventional belt conveyor and is adapted for hoisting a counterweight of the belt conveyor.

Figure 2:
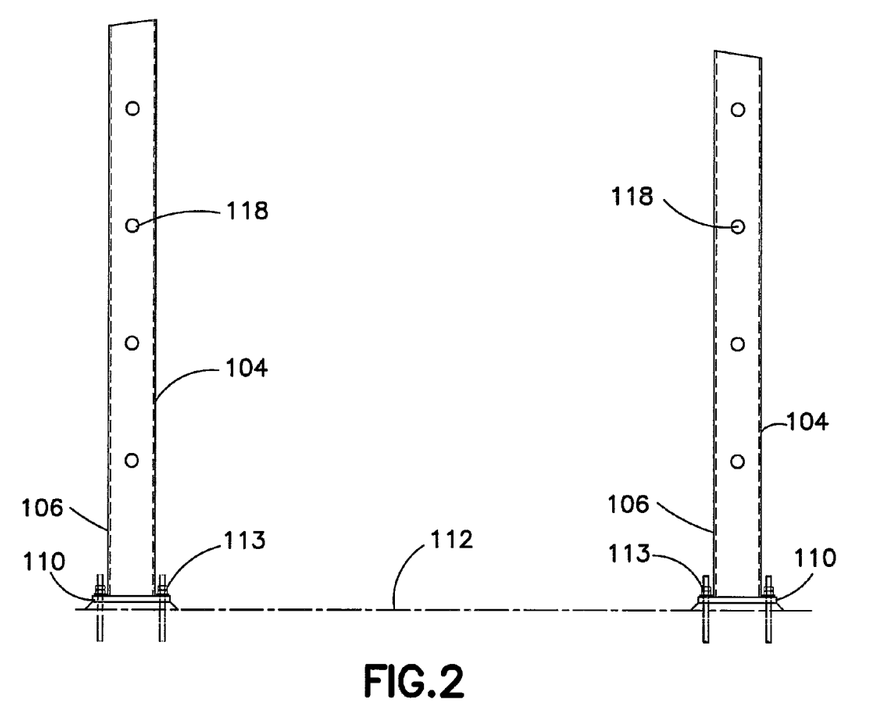
FIG. 2 is a front view of a portion of a frame of the counterweight hoisting apparatus shown in FIG. 1.

With reference to FIGS. 1-2, hoisting apparatus 100 includes a frame 102 defined by a pair of substantially vertical columns 104. The columns 104 are arranged substantially parallel to each other such that the distance between the columns 104 is substantially constant along the entire longitudinal length of the columns 104. In one embodiment, the frame 102 may include a second pair of columns 104 (not shown) arranged substantially parallel to each other. Each column 104 defines a first end 106 opposite a second end 108. First end 106 of each column 104 includes a mounting base 110 for securing each column 104 to the ground 112. The mounting base 110 may be monolithically formed with each column 104, or it may be removably or otherwise secured to first end 106 of each column 104. In one embodiment, each column 104 is secured to the ground 112 by one or more fasteners 113 extending through the mounting base 110 into the ground 112. In one embodiment, the mounting base 110 may be separated from the ground 112 by an intermediate layer of material (not shown). However, in each case, the one or more fasteners 113 connect the mounting base 110 of each column 104 to the ground 112. In an alternate embodiment, each column 104 may be directly secured to the ground 112 without the use of a mounting base 110.

Figure 3:
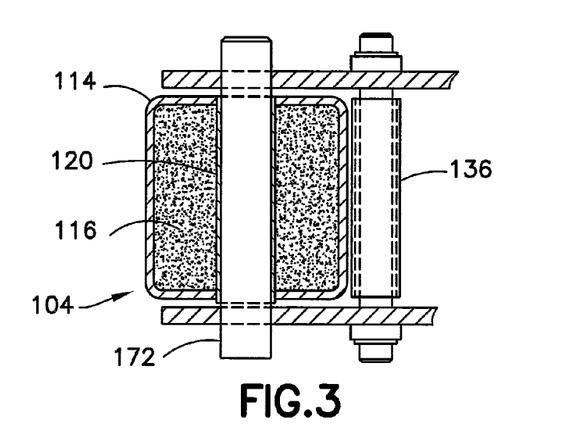
FIG. 3 is a cross sectional view of a portion of the frame of the counterweight hoisting apparatus shown in FIG. 1.

With reference to FIG. 3 each column 104 is a substantially tubular structure having a sidewall 114 and defining a hollow interior. The tubular structure of each column 104 has a square cross-sectional shape, as shown in FIG. 3. In other embodiments, the tubular structure of each column 104 may have a rectangular cross-sectional shape (not shown), or any other shape. Each column 104 is desirably made from metal, such as steel; although the use of other materials, such as plastic or composite materials, is not precluded. Optionally, the hollow interior of each column 104 may be filled with a grout material 116 to increase the strength of the columns 104.

Referring back to FIGS. 1-2, each column 104 includes a plurality of openings 118 extending through the thickness of the column 104. The plurality of openings 118 is disposed at substantially equal intervals along the longitudinal length of each column 104. In an alternate embodiment, the plurality of openings 118 is spaced at unequal intervals. Each of the plurality of openings 118 extends through the sidewall 114 of the columns 104. Optionally, as shown in FIG. 3, a sleeve 120 may be provided to extend across each opening 118. The sleeve 120 desirably extends between opposing portions of sidewall 114 through which the opening 118 extends. The sleeve 120 is provided to prevent the plurality of openings 118 from being obstructed in embodiments where the hollow interior of each column 104 is filled with the grout material 116 (see FIG. 3). Each of the plurality of openings 118 is adapted to receive a pin, as will be described in greater detail hereafter.

With continuing reference to FIGS. 1-2, the hoisting apparatus 100 includes a hoisting mechanism 138 movable relative to the frame 102 between the first end 106 the and second end 108 of the columns 104. The hoisting mechanism 138 is movable from the first end 106 toward the second end 108, or vice versa, in a series of incremental steps, as will be described hereinafter. With specific reference to FIG. 1, the hoisting mechanism 138 is connected to a counterweight 122. In one embodiment, the hoisting mechanism 138 is releasably connected to the counterweight 122. In other embodiments, the hoisting mechanism 138 is permanently attached to the counterweight 122.

As shown in FIG. 1, the counterweight 122 is positioned between the columns 104. The counterweight 122 includes a plurality of weights 124 held within a counterweight cage 126. Weights 124 may be added or removed from the counterweight cage 126 in order to adjust the weight of the counterweight 122 and thereby adjust the tension of the conveyor belt. An upper end of the counterweight cage 126 includes a cross beam 128 extending substantially perpendicular to the pair of columns 104. The cross beam 128 includes a pair of pulley bearing supports 130 for rotatably supporting a pulley element 132. A belt 134 extends around the pulley element 132 such that the counterweight 122 is suspended from the belt 134. In an embodiment where the counterweight cage 126 is positioned close to the frame 102 of the hoisting apparatus 100 such that the counterweight cage 126 may contact the frame 102, one or more rollers 136 (best shown in FIG. 3) may be disposed on the counterweight cage 126 to facilitate rolling contact between the counterweight cage 126 and the columns 104 of the frame 102. The counterweight cage 126 further includes a pair of recesses 170 in alignment with the openings 118 on each of the columns 104. Each recess 170 is defined as an arcuate slot that corresponds to a portion of the opening 118. Each recess 170 is supported on the column 104 by a pin 172 that extends through the opening 118 on the column 104 and engages the recess 170 to support the weight of the counterweight 122.

Figure 4:
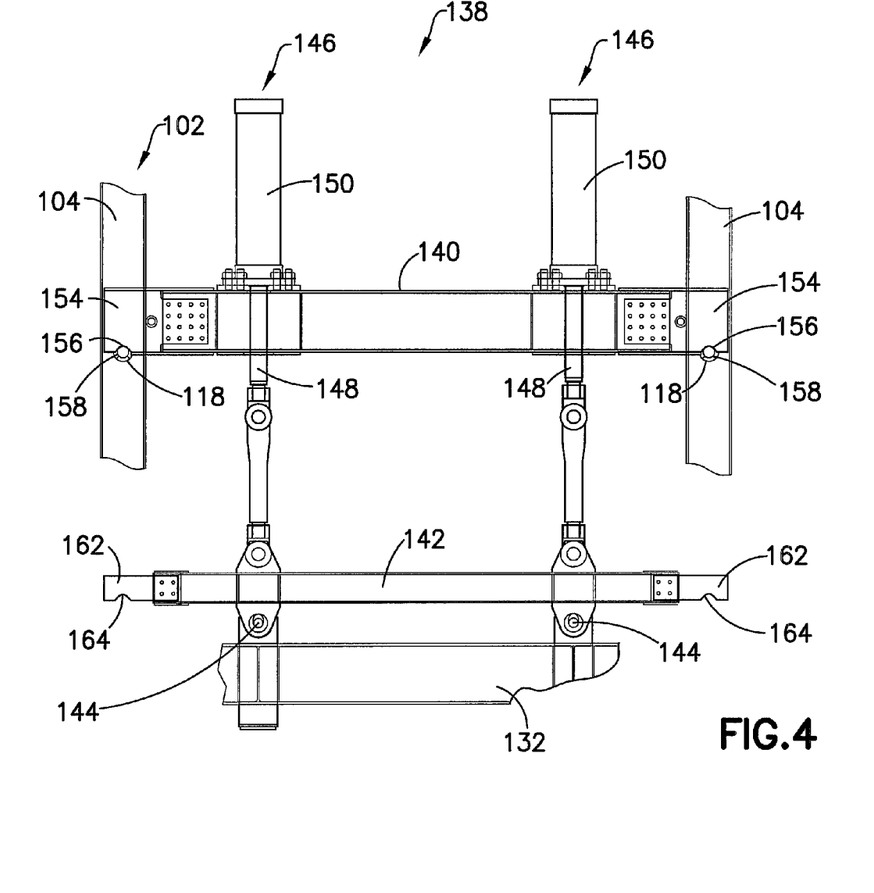
FIG. 4 is a detailed front view of a hoisting mechanism of the counterweight hoisting apparatus shown in FIG. 1.

With reference to FIG. 4, a detailed view of the hoisting mechanism 138 is illustrated. The hoisting mechanism 138 is adapted for lifting the counterweight 122 to change its position relative to the frame 102. The hoisting mechanism 138 includes a carriage 140 connected to a tie bar 142. The counterweight 122 is connected or connectable to the tie bar 142 by two or more pins 144. The carriage 140 and the tie bar 142 are substantially parallel to each other, and are movable relative to each other and relative to the columns 104 of the frame 102. In the embodiment shown in FIG. 4, the carriage 140 and the tie bar 142 are substantially perpendicular relative to the columns 104 of the frame 102. Desirably, the carriage 140 and the tie bar 142 are movable in unison relative to the columns 104 to maintain the substantially perpendicular orientation relative to the columns 104.

With continuing reference to FIG. 4, the hoisting mechanism 138 includes at least one lifting device 146 disposed between the carriage 140 and the tie bar 142. In one non-limiting embodiment, the at least one lifting device 146 is a hydraulic system having a piston/cylinder arrangement where piston 148 is movable relative to the cylinder 150 under hydraulic pressure. In another embodiment, the at least one lifting device 146 is a pneumatic system having a piston/cylinder arrangement where the piston 148 is movable relative to the cylinder 150 under pneumatic pressure. In yet another embodiment, the at least one lifting device 146 is an electric actuator powered by electrical energy. One of ordinary skill in the art will understand that the at least one lifting device 146 may include a combination of hydraulic, pneumatic, electric, or mechanical devices. In the embodiment shown in FIG. 4, the cylinder 150 of the at least one lifting device 146 is secured to the carriage 140 and an end portion of the piston 148 is secured to the tie bar 142. As the piston 148 of the at least one lifting device 146 is moved relative to the cylinder 150, the distance between the carriage 140 and the tie bar 142 changes correspondingly. In other words, as the piston 148 extends out of the cylinder 150 under hydraulic or pneumatic pressure, the tie bar 142 is urged away from the carriage 140. Conversely, as the piston 148 retracts into the cylinder 150, the tie bar 142 is moved closer to the carriage 140. In an embodiment where more than one lifting device 146 is used, it is desirable to operate the more than one lifting device 146 in unison such that the spacing between the carriage 140 and the tie bar 142 is maintained constant as the lifting devices 146 are operated.

Figure 5A:
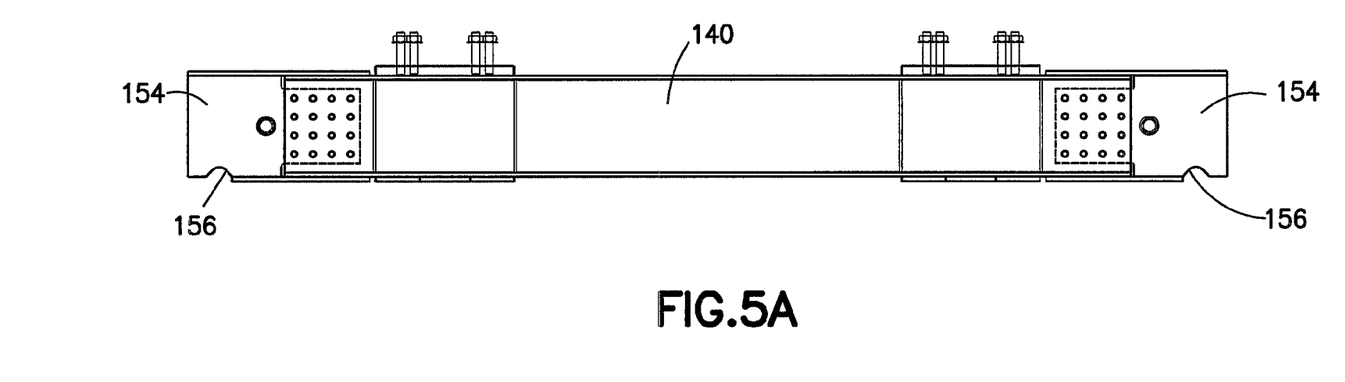
FIG. 5A is a side view of a carriage of the counterweight hoisting apparatus shown in FIG. 1.
Figure 5B:
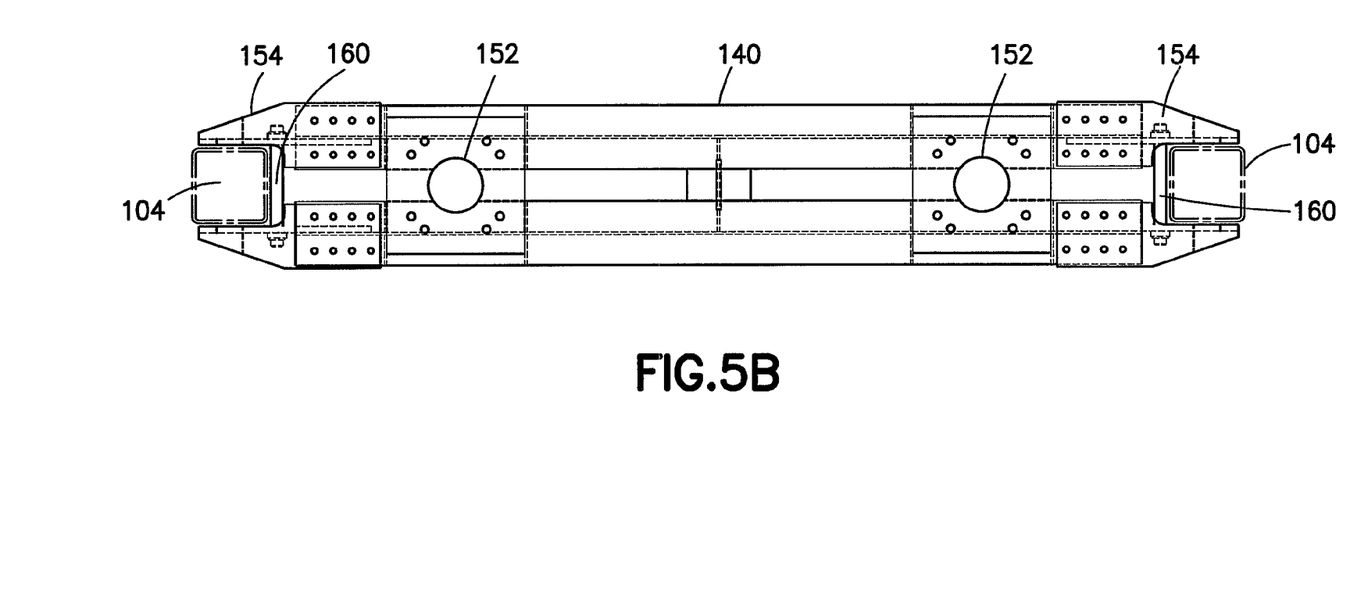
FIG. 5B is a top view of the carriage shown in FIG. 5A.

With reference to FIGS. 5A-5B, detailed views of the carriage 140 are illustrated. The carriage 140 is disposed between the columns 104 of the frame 102 such that the carriage 140 is movable relative to the columns 104. In one embodiment, the carriage 140 is movable in a vertical direction relative to the columns 104. The carriage 140 is substantially perpendicular to the columns 104. As shown in FIG. 5A, the carriage 140 includes an upper end that provides a mounting surface for the cylinders 150 of the lifting device 146. The piston 148 of each cylinder 150 extends through a hole 152 (shown in FIG. 5B) that extends through the carriage 140. Each of the terminal ends 154 of the carriage 140 is adapted to at least partially surround each of the columns 104. A lower portion of each terminal end 154 includes a recess 156 in alignment with the plurality of openings 118 on each column 104. Each recess 156 is defined as an arcuate slot that corresponds to a portion of the opening 118. Terminal ends 154 of the carriage 140 are adapted to support the weight of the carriage 140 and any additional load imposed on the carriage 140 due to the counterweight 122 being suspended therefrom. Each terminal end 154 is supported on the column 104 by a pin 158 that extends through the opening 118 on the column 104 and engages the recess 156 on the terminal end 154 of the carriage 140. During movement of the carriage 140 relative to the columns 104, a pair of rollers 160 (shown in FIG. 5B) is provided on the terminal ends 154 of the carriage 140 to facilitate rolling movement.

Figure 6A:
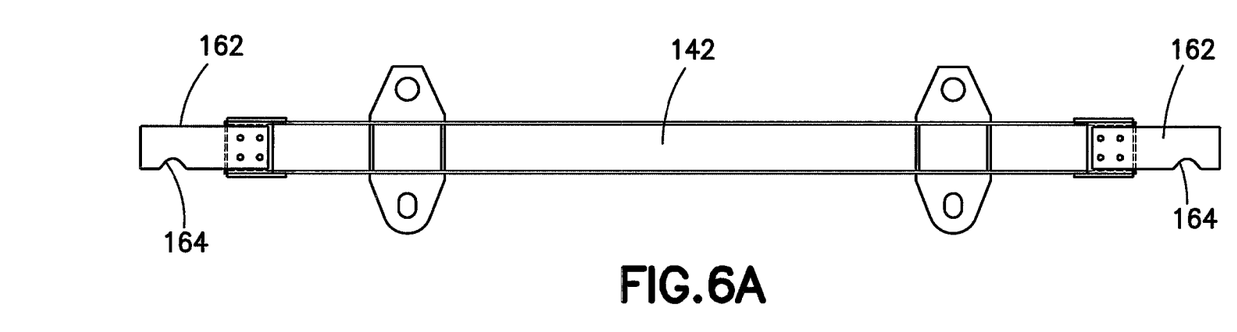
FIG. 6A is a side view of a tie bar of the counterweight hoisting apparatus shown in FIG. 1.
Figure 6B:
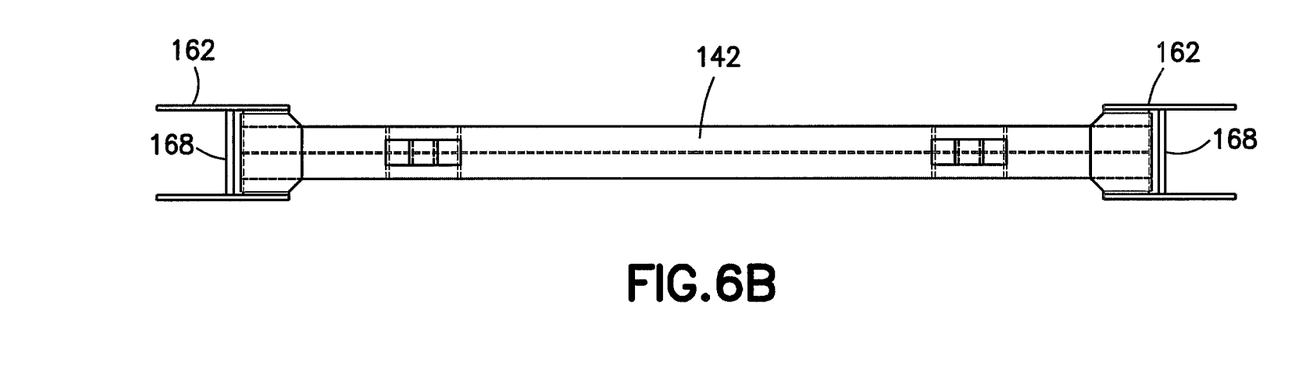
FIG. 6B is a top view of the tie bar shown in FIG. 6A.

With reference to FIGS. 6A-6B, detailed views of the tie bar 142 are illustrated. The tie bar 142 is disposed between the columns 104 of the frame 102 such that the tie bar 142 is movable relative to the columns 104. In one embodiment, the tie bar 142 is movable in a vertical direction relative to the columns 104. The tie bar 142 is substantially perpendicular to the columns 104. As shown in FIG. 6A, the tie bar 142 includes an upper end that provides an attachment point for the pistons 148 of the lifting device 146. The lower end of the tie bar 142 includes an attachment point to attach to the counterweight 122. Each of the terminal ends 162 of the tie bar 142 is adapted to at least partially surround each of the columns 104. Similar to the recesses 156 on the carriage 140, a lower portion of each terminal end 162 includes a recess 164 in alignment with the plurality of openings 118 on each column 104. Each recess 164 is defined as an arcuate slot that corresponds to a portion of the opening 118. Terminal ends 162 of the tie bar 142 are adapted to support the weight of the tie bar 142 and any additional load imposed on the tie bar 142 due to the counterweight 122 being suspended therefrom. Each terminal end 162 is supported on the column 104 by a pin 166 that extends through the opening 118 on the column 104 and engages the recess 164 on the terminal end 162 of the tie bar 142. During movement of the tie bar 142 relative to the columns 104, a pair of rollers 168 (shown in FIG. 6B) is provided on the terminal ends 162 of the tie bar 142 to facilitate rolling movement.

Having described the structure of the counterweight hoisting apparatus 100 with reference to FIGS. 1-6B, a method of operating the hoisting apparatus 100 to hoist the counterweight 122 will now be described with reference to FIGS. 7A-7C. The counterweight 122 is hoisted in an upward or downward direction relative to the frame 102 in a series of incremental steps. During each step, the counterweight 122 is hoisted by a fixed distance equivalent to the vertical stroke of the cylinder extending through each of the columns 104.

Figure 7A:
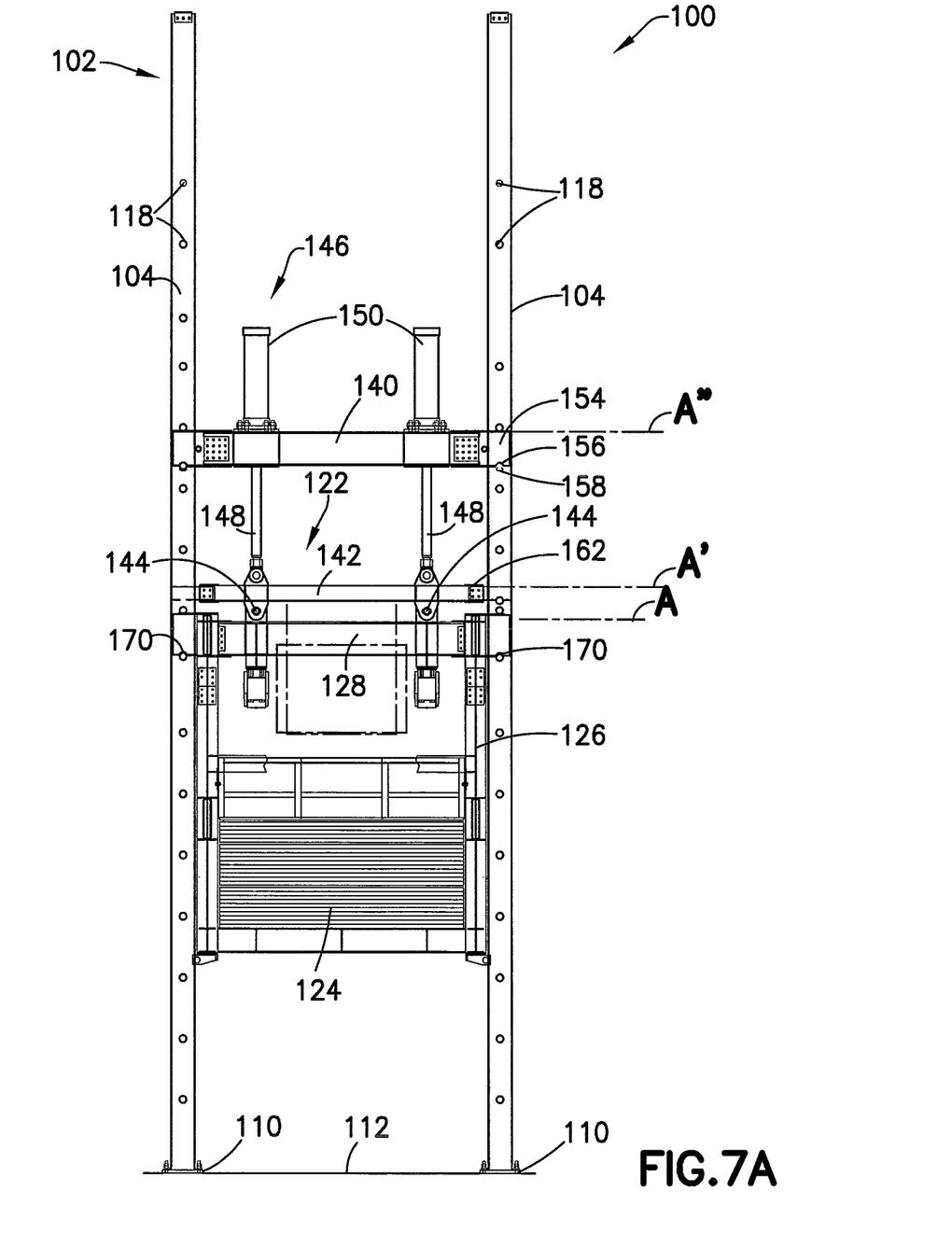
FIG. 7A is a front view of the counterweight hoisting apparatus shown in a first position.
Figure 7B:
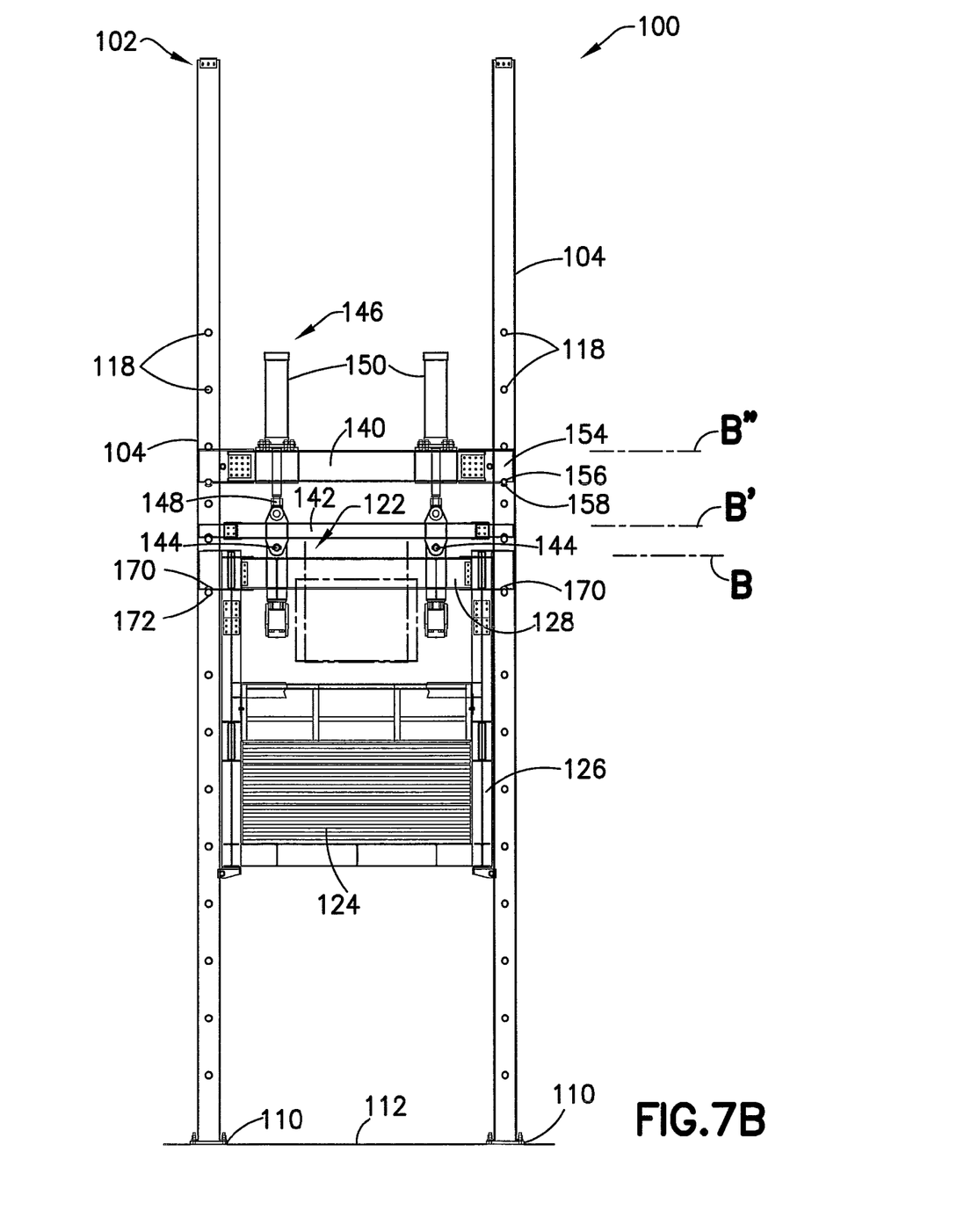
FIG. 7B is a front view of the counterweight hoisting apparatus shown in a second position.
Figure 7C:
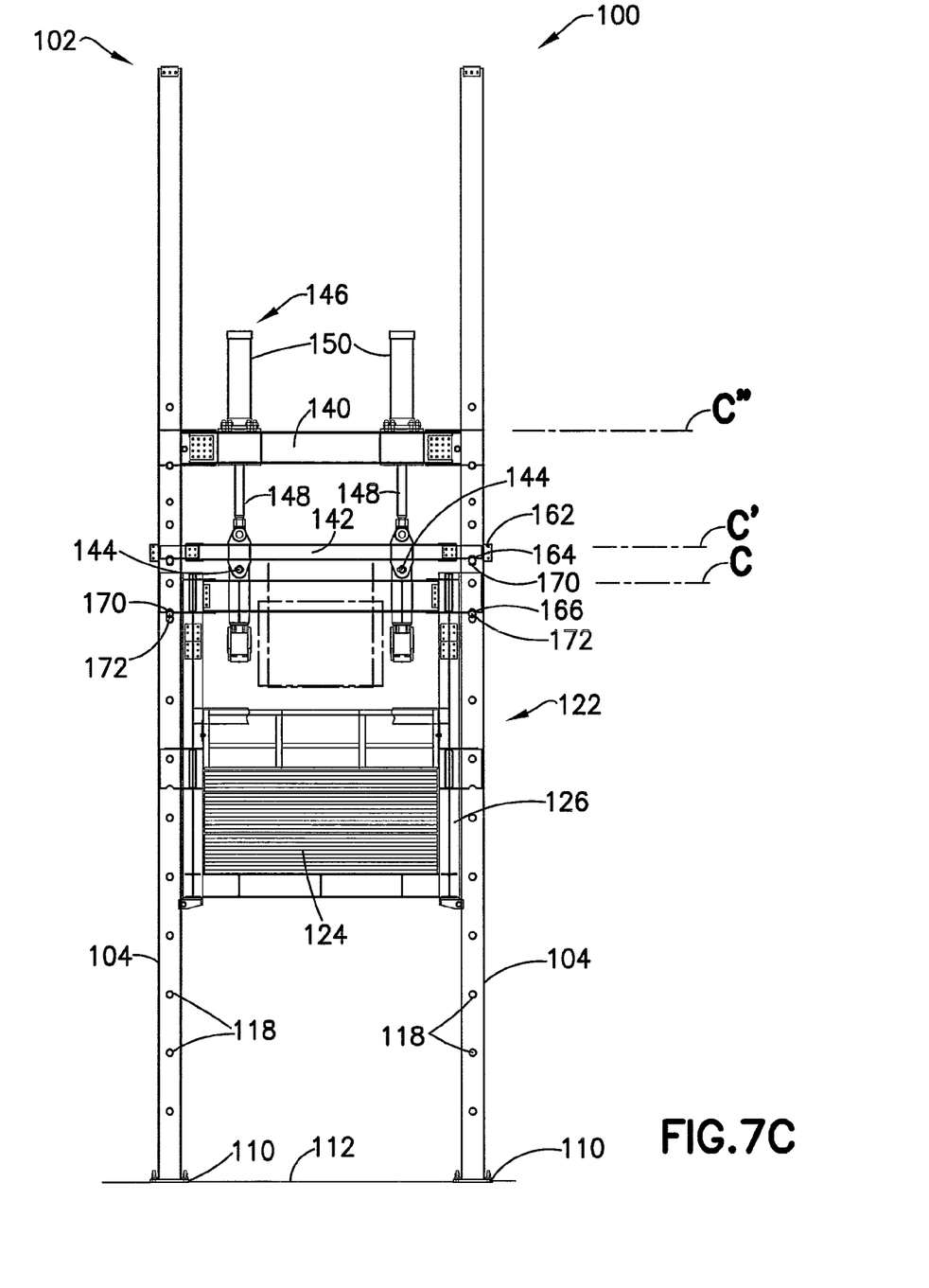
FIG. 7C is a front view of the counterweight hoisting apparatus shown in a third position.

While FIGS. 7A-7C illustrate a single hoisting step in an upward direction, one of ordinary skill in the art will understand that multiple hoisting steps can be performed in an incremental manner to lift the counterweight 122 from an initial desired position to a final desired position. In the first hoisting step, the counterweight 122 is hoisted from a first position labeled A in FIG. 7A to a second position labeled B in FIG. 7B. Initially, with reference to FIG. 7A, the counterweight 122 is suspended on the frame 102, where the pins 172 extend through the openings 118 on the columns 104 and support the counterweight cage 126 by engaging the recess 170 on the counterweight cage 126. In this initial position, the counterweight 122 is also connected to the tie bar 142 by pins 144. The tie bar 142 is located in a first position labeled B' in FIG. 7B. The pins 166 on the tie bar 142 are disengaged from the openings 118 on the columns 104 at the reference position B' such that the tie bar 142 is free to move vertically relative to the columns 104. With continuing reference to FIG. 7A, the carriage 140 is positioned at a first position labeled A" such that the pistons 148 are withdrawn into the cylinders 150. The carriage 140 is secured to the frame 102 by pins 158 which engage the recess 156 on the terminal ends 154 of the carriage 140 and extend through the openings 118 on the columns 104 at the reference position B".

With reference to FIG. 7B, the hoisting apparatus 100 is shown in a position after a first incremental lifting step has been performed. Prior to activating the lifting device 146, pins 172 are removed from the counterweight cage 126 such that the entire weight of the counterweight 122 is borne by the carriage 140. Upon activation of the lifting device 146, the pistons 148 are withdrawn into the cylinders 150 such that the tie bar 142 is urged toward the carriage 140. While the position B" of the carriage 140 (FIG. 7B) is maintained at the same level as the position A" in FIG. 7A, the position B' of the tie bar 142 in FIG. 7B is raised relative to the position A' in FIG. 7A by a distance D, which is equivalent to at least a portion of the stroke of the pistons 148. Similarly, because the counterweight 122 is directly connected to the tie bar 142 by pins 144, the position B of the counterweight 122 in FIG. 7B is raised relative to the position A in FIG. 7A by a distance D, which is equivalent to at least a portion of the stroke of the pistons 148. The distance D corresponds to the separation between two or more openings 118 such that during each hoisting step, the counterweight 122 is hoisted from a first position to a second position vertically offset from the first position by the distance D.

With reference to FIG. 7C, after completing the hoisting step, one or both of the tie bar 142 and the counterweight 122 are secured to the frame 102 by inserting the pins 166, 172, respectively, through the openings 118 in the columns 104. The pins 158 that secure the carriage 140 to the frame 102 are removed such that the carriage 140 may be moved relative to the columns 104. Because the prior hoisting step resulted in the pistons 148 being withdrawn into the cylinders 150, the lifting mechanism 146 is reset for a subsequent hoisting step by activating the pistons 148 to extend out from the cylinders 150. This process causes the carriage 140 to be displaced from a position B" in FIG. 7B to a position C" in FIG. 7C. The displacement of the carriage 140 from position B" to position C" is equal to at least a portion of the stroke of the pistons 148. During the displacement of the carriage 140 from position B" to position C", the tie bar 142 and the counterweight 122 are maintained at positions B' and B, respectively. After raising the carriage 140 to position C", the pins 158 are reinserted to secure the carriage 140 relative to the frame 102. After completing this last step, the hoisting apparatus 100 is primed for a subsequent hoisting process which involves repeating the steps described above. By repeating the hoisting steps, the counterweight 122 may be lifted from an initial position to a final desired position in a series of incremental lifts equivalent to the stroke of the pistons 148. The counterweight 122 may be lowered from a raised position by reversing the steps described above.

While embodiments of the counterweight hoisting apparatus 100 and methods of operation thereof were provided in the foregoing description, those skilled in the art may make modifications and alterations to these embodiments without departing from the scope and spirit of the invention. Accordingly, the foregoing description is intended to be illustrative rather than restrictive. The invention described hereinabove is defined by the appended claims and all changes to the invention that fall within the meaning and the range of equivalency of the claims are to be embraced within their scope.

The invention claimed is:

1. A counterweight hoisting apparatus adapted for hoisting a counterweight of a belt conveyor, the counterweight hoisting apparatus comprising:
   at least one pair of substantially vertical columns defining a frame; each of the at least one pair of columns having a hollow interior and a plurality of openings extending through a sidewall;
   a tie bar selectively securable to the at least one pair of columns and oriented substantially perpendicular to the at least one pair of columns;
   a carriage selectively securable to the at least one pair of columns and oriented substantially perpendicular to the at least one pair of columns; and
   a lifting device connected to the tie bar at a first end and to the carriage at a second end,
   wherein the lifting device is operable to cause movement of the tie bar relative to the at least one pair of columns when the carriage is secured to the at least one pair of columns and to cause movement of the carriage relative to the at least one pair of columns when the tie bar is secured to the at least one pair of columns, and
   wherein one or both of the tie bar and the carriage are selectively securable to the at least one pair of columns by at least one pin extending through at least one of the plurality of openings.

2. The counterweight hoisting apparatus of claim 1, wherein the lifting device comprises a cylinder secured to one of the tie bar and the carriage and a piston secured to the other of the tie bar and the carriage.

3. The counterweight hoisting apparatus of claim 1, wherein the lifting device is hydraulically operated.

4. The counterweight hoisting apparatus of claim 1, wherein the lifting device is pneumatically operated.

5. The counterweight hoisting apparatus of claim 1, wherein the at least one pin engages at least one recess on the tie bar or the carriage.

6. The counterweight hoisting apparatus of claim 1, wherein the openings are separated at substantially equal intervals along a longitudinal length of each of the at least one pair of columns.

* * * * *